Jan. 12, 1943.   J. SLEPIAN   2,307,749
ELECTRIC HEATING OF METAL ROD ENDS
Filed April 15, 1941
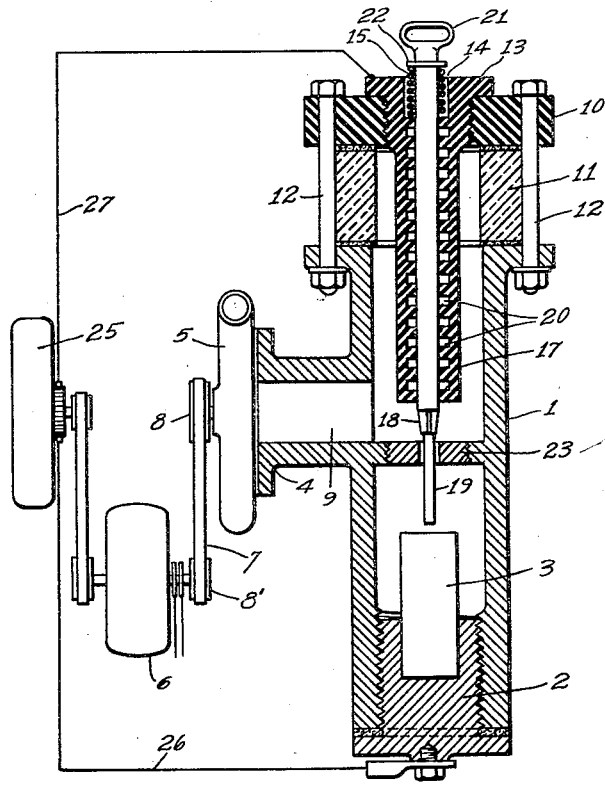
WITNESSES:
INVENTOR
Joseph Slepian.
BY
ATTORNEY Patented Jan. 12, 1943

2,307,749

UNITED STATES PATENT OFFICE 2,307,749

ELECTRIC HEATING OF METAL ROD ENDS

Joseph Slepian, Pittsburgh, Pa., assignor to Westinghouse Electric & Manufacturing Company, East Pittsburgh, Pa., a corporation of Pennsylvania Application April 15, 1941, Serial No. 388,621

3 Claims. (Cl. 219—15)

This invention relates to rapid heating of metallic parts required in the manufacture of various equipments. More particularly, the invention relates to the rapid heating of metallic rods or like material by means of an electric arc discharge, or by electric current flowing across poor contacts between conductors.

In the manufacture of different kinds of equipment, machinery and other products, it is often necessary to raise the temperature of certain metallic parts to a very high degree in order to prepare these parts for further manufacturing operations or for the heat treatment necessary in hardening processes. In the present state of mass production of different devices, it is desirable to effect the heating of certain component parts very rapidly in quick succession so as to produce a great number of these parts in a short time. The methods heretofore proposed lack the necessary speed of operation, or the apparatus available for the heating requires a considerable expenditure of energy to produce the thermal effect within prescribed time limits. As an example, in the manufacture of internal combustion engines, the valve-stems must undergo a hardening operation which involves the heating of these stems to a high temperature. The heating process employed must be capable of heating these stems uniformly and in the methods heretofore known the production rate is generally slowed down due to the time required to bring the valve stems up to the specified temperature.

A particular feature of this invention is that the uniform heating of metallic rods, such, for example, as valve stems, may be effected in an exceedingly short time with the minimum expenditure of energy required.

A further advantage of the invention is the simplicity of structural assembly of the apparatus particularly adaptable for production work.

Another feature of the invention is that the heating effect of an electrical current is utilized in such manner that, either by an arc discharge or by current conductive contact, the entire surface of the rods to be heated will be exposed to the thermal effect, and the heat will be uniformly distributed in the metallic substance.

Other objects and advantages will be apparent from the following description of the invention, pointed out in particularity by the appended claims, and taken in connection with the accompanying drawing, which shows one embodiment of the invention utilizing an electric arc discharge for the heating.

Referring to the figure, the basic principles of the operation are illustrated by an elementary apparatus showing, by way of example, the essential components. The invention is not intended to be limited to the physical structure herein shown, and various modifications may be effected without departing from the underlying principles of operation.

In the apparatus shown in the figure, the operation is based upon the phenomenon that an arc drawn between two conducting bodies in a rarefied atmosphere extends over a large area in comparsion with a small area under atmospheric pressure. This will be described in greater detail in connection with the description of the apparatus. The latter consists essentially of a chamber 1 of cylindrical construction, one end of which is tightly closed by a threaded base 2. Within the space is embedded an electrode 3. The side wall of the chamber is extended into an outlet forming a flanged portion 4. This cooperates with a suitable vacuum pump 5, which when driven by the motor 6 through any suitable coupling—shown here by way of example as a belt and pulley arrangement 7, 8 and 8', respectively—will exhaust the chamber 1. The physical dimensions of the air outlet passage 9 and the pump 5 are so proportioned that when the chamber is sealed the required degree of vacuum will be produced almost instantaneously. The chamber 1 is sealed off by a cover 10 which is suitably insulated electrically therefrom through an insulating ring 11. The cover 10 may be clamped down tightly by means of bolts 12. Within the cover 10 is fitted a bushing 13 having a re-entrant portion 14 which accommodates a spring 15. The bushing 13 extends well within the chamber 1, and accommodates a plunger 17, to which is attached a suitable chuck 18 for holding the rod 19 which is to be heated. The inner surface of the bushing 13 has a plurality of ventricles 20 which form air locks in cooperation with the tight fitting body of the plunger 17. The outside end of the plunger 17 has a handle 21 for manipulation thereof in and out of the chamber. A collar 22 is provided on the plunger 17 to cooperate with the spring 15. This will be described in more detail in connection with the operation of the apparatus.

A suitable source of electrical energy, shown here schematically by a generator 25, is connected to the main body of the chamber through lead 26 and to the bushing 13 through lead 27. The generator 25, as well as the pump 5, may be driven by the same motor 6 through a similar belt and pulley arrangement or by any suitable driving means.

For a rapid heating of rods having the size generally employed for motor vehicle valve stems, it is calculated that approximately 5 kilowatts of electrical energy will be required. When the atmospheric pressure is reduced to a few millimeters of mercury, an arc drawn between the end of the rod 19 and the electrode 3 will cover the whole exposed area of the rod, and the arc will conduct a current of approximately 500 amperes. The generator and the pump are in continuous operation, and the plunger 17 is withdrawn from the chamber and a rod is placed in the chuck 18. As the plunger 17 is inserted, the chamber is sealed by the close fit thereof within the bushing and the air locks provided by the ventricles 20. The handle 21 may be pressed as far as the spring 15 will permit which allows a contact between the tip of the rod 19 and the electrode 3. Upon release of the handle 21, the spring 15 withdraws the plunger to a sufficient distance to permit the drawing of an arc. The rapid action of the pump 5 reduces the pressure within the chamber as soon as the plunger 17 is inserted in the bushing 13, so that by the time the arc is drawn the pressure will be low enough to extend the arc over the entire surface of the rod 19. The separating ring 23 is supported by the inner wall of the chamber and forms a partition at the point where the chuck 18 is held under operation. The ring 23 is at cathode potential and prevents the arc to extend further through the body of the rod. Within a few seconds after this operation, the rod reaches the required temperature, at which time the plunger is withdrawn and the rod removed, and another may be inserted in the chuck 18 to repeat the same operation.

Within a very short period of time, a great number of rods may be heated in such manner with a small amount of energy expended since electrical current flow is limited only for the short duration of time while the arc produces its heating effect. Upon removal of the plunger, there is no current flow and there is no unnecessary waste of heating energy.

I claim as my invention:

1. In an apparatus for the rapid heating of metal rods, a chamber divided into two compartments, a seal for said chamber located in one compartment and including electrical insulating means through which a rod to be heated may be inserted to produce a substantially hermetical seal while said rod extends into the other compartment, an electrode within said other compartment cooperating with said rod to form an electrical contact with the end thereof, a source of current electrically connected to said rod and said electrode, means for effecting said electrical contact for a time required to initiate an electric arc between said rod and said electrode, and means for maintaining low atmospheric pressure during said arcing whereby said arc extends over the entire surface of said rod.

2. In an apparatus for the rapid heating of metal rods, a chamber divided into two compartments, an opening therein, a suction pump attached to said opening, said opening and said pump being of relatively large dimensions for rapid evacuation of said chamber, a seal for said chamber located in one compartment and comprising a bushing insulated therefrom and extending within said compartment, a rod slidable within said bushing to extend into said other compartment and providing a substantially hermetical seal in cooperation with the inner wall of said bushing upon insertion therein, an electrode in said other compartment, a source of current connected to said electrode and said bushing and means for contacting said electrode and said rod when said rod is placed in said bushing whereby to draw an electric arc, said chamber being at low atmospheric pressure due to the rapid evacuation effected by said pump.

3. In an apparatus for the rapid heating of metal rods, a chamber, an opening therein, a suction pump attached to said opening, said opening and said pump being of relatively large dimensions for rapid evacuation of said chamber, a seal for said chamber comprising a bushing insulated therefrom and extending within said chamber, a plurality of ventricles in the inner wall of said bushing, a holder for said rods to be heated comprising a plunger adapted to slide within said bushing and cooperate with the inner wall thereof and said ventricles forming air locks therewith providing a substantially hermetical seal upon insertion of said holder, an electrode in said chamber, a source of current connected to said electrode and said bushing and spring means retained in said bushing and compressively engaged by said holder upon total insertion thereof for permitting contact between said electrode and the end of said rod in said holder, said means automatically separating said rod and said electrode upon release of pressure on said holder to a sufficient extent for drawing an electric arc therebetween, said chamber being at low atmospheric pressure due to the rapid evacuation by said pump, said arc in consequence thereof extending over the entire surface of said rod and producing a uniformly distributed thermal effect.

JOSEPH SLEPIAN.